(12) United States Patent
Scott

(10) Patent No.: US 11,786,071 B1
(45) Date of Patent: Oct. 17, 2023

(54) SELF-BASTING ROTISSERIE

(71) Applicant: James D. Scott, Manassas, VA (US)

(72) Inventor: James D. Scott, Manassas, VA (US)

( * ) Notice: Subject to any disclaimer, the term of this patent is extended or adjusted under 35 U.S.C. 154(b) by 250 days.

(21) Appl. No.: 17/326,808

(22) Filed: May 21, 2021

(51) Int. Cl.
*A47J 37/04* (2006.01)
*A47J 37/07* (2006.01)

(52) U.S. Cl.
CPC .......... *A47J 37/042* (2013.01); *A47J 37/047* (2013.01); *A47J 37/0745* (2013.01); *A47J 37/0704* (2013.01)

(58) Field of Classification Search
CPC ........ A47J 37/04; A47J 37/041; A47J 37/042; A47J 37/045; A47J 37/047; A47J 37/06; A47J 37/07; A47J 37/0704; A47J 37/0709; A47J 37/0713; A47J 37/0718; A47J 37/0727; A47J 37/0731; A47J 37/074; A47J 37/0745; A47J 37/0786; A47J 37/106
USPC ............ 99/419, 421 H, 421 HH, 421 M, 427
See application file for complete search history.

(56) References Cited

U.S. PATENT DOCUMENTS

| | | | |
|---|---|---|---|
| 2,813,478 A | 11/1957 | Popple | |
| 3,079,909 A * | 3/1963 | Bemben | A47J 37/0718 99/421 H |
| 3,224,362 A | 12/1965 | Kozar | |
| 3,633,491 A * | 1/1972 | Williams, Jr. | F24C 15/164 99/421 H |
| 4,061,083 A | 12/1977 | Caliva | |
| 4,177,721 A | 12/1979 | Redhead | |
| 5,515,774 A * | 5/1996 | Swisher | A47J 37/041 99/421 H |
| 5,536,518 A * | 7/1996 | Rummel | A47J 37/074 126/41 R |
| 6,220,152 B1 | 4/2001 | Baldwin et al. | |
| 6,766,730 B2 | 7/2004 | Wrenn | |
| 6,892,628 B2 | 5/2005 | Northern | |
| 8,272,321 B1 * | 9/2012 | Kalsi | A47J 37/041 99/421 H |
| 8,438,970 B2 | 5/2013 | Rayment et al. | |
| 2009/0282989 A1* | 11/2009 | Garnache | A47J 37/042 99/427 |

* cited by examiner

*Primary Examiner* — Hung D Nguyen
(74) *Attorney, Agent, or Firm* — CRAMER PATENT & DESIGN, PLLC; Aaron R. Cramer

(57) ABSTRACT

A self-basting rotisserie is a rotisserie unit which fits within the confines of a conventional smoker style grill. A selection of meat is placed in a tray or on a spit and travels into and out of the hottest part of the smoker via a motor drive. As the food reaches the bottom of the travel path, it moves through a second tray which holds the user's choice of basting liquid.

12 Claims, 7 Drawing Sheets

SELF-BASTING ROTISSERIE

RELATED APPLICATIONS

Not applicable.

FIELD OF THE INVENTION

The presently disclosed subject matter is directed to a rotisserie and more specifically to a self-basting rotisserie.

BACKGROUND OF THE INVENTION

Basting is a common cooking technique when preparing cooking various pieces of meat. Such foods will become dry if they are not basted several times during the cooking process. Common basting liquids such as sauces, melted butter, liquid fat, meat drippings, or liquid such as a stock are usually spooned over the food or applied with a conventional bulb-type siphon. Basting is commonly performed while cooking foods on a smoker as well. While such methods have worked well for generations, they do possess some disadvantages.

First, the chef may easily forget about the next basting interval causing an entire meal to be ruined. Secondly, the door of the smoker must be opened to perform the basting process, thus causing uneven temperature regulation, all while exposing the cook to high heat levels. Finally, and perhaps most important, the basting process only gets to a few surfaces of the meat due to the meat's static position on the smoker grill. Accordingly, there exists a need for a means by which meats can be prepared in a smoker in a juicy and moist manner without the disadvantages as described above. The development of the self-basting rotisserie fulfills this need.

SUMMARY OF THE INVENTION

The principles of the present invention provide for a self-basting rotisserie device has a smoker-style grill which in turn has a smoker enclosure, an access door, and a stand. The smoker-style grill includes a liquid tray which contains a plurality of basting liquids which are located at a bottom of the smoker enclosure. The self-basting rotisserie also has a firebox which is disposed on a first end of the smoker-style grill, a rotisserie power drive disposed on a second end of the smoker-style grill and an AC power cord for connection to a power source, and a first end plate disposed on the first end of the smoker-style grill. The firebox contains a fuel source and a smoke source, and the first end plate is in fluid communication with the firebox.

The basting liquids may be selected from the group consisting of one or more sauces, a plurality of melted butter, a plurality of liquid fat, one or more meat drippings, or a stock. The firebox may be located in relation to the liquid tray is such that there is no direct transfer of heat from the fuel contents of the firebox to the liquid tray and there may be limited or no boiling away of the basting liquid in the liquid tray. The fuel source may be selected from the group consisting of a plurality of charcoal, a plurality of wood chunks, or a plurality of wood chips. The smoke source may be selected from the group consisting of a plurality of charcoal, a plurality of wood chunks, or a plurality of wood chips. The rotisserie power drive may rotate a central hexagonal shaft which runs through and penetrates a pair of smoker enclosure sidewalls. The rotisserie power drive may drive the central hexagonal shaft whereupon it may be supported at a distal end bracket assembly.

The first end plate may be supported on the central hexagonal shaft and is fixed in position with three threaded rods which work with a plurality of locking nuts in an expected manner to keep the first end plate in a parallel and aligned position. The first end plate may include three self-leveling food baskets, which may remain in a level position as the central hexagonal shaft rotates. The three self-leveling food baskets may be attached to the first end plate and the second end plate by a single rotating shaft. The self-leveling food baskets within the smoker enclosure may always over the liquid tray which spans the smoker enclosure. The self-leveling food baskets may be open in design with a plurality of wire basket elements running at 90° degrees to each other.

The three threaded rods connect to the first end plate and the second end plate in an equally spaced manner to the self-leveling food baskets. The second end plate and the first end plate rotates either clockwise or counter-clockwise along a rotational travel path. Each of the rotating self-leveling food baskets may pass through a basting liquid confined within the liquid tray to ensure that all surfaces of a contained food in the self-leveling food baskets will be coated. A lowermost self-leveling food basket may exist the basting liquid and a plurality of excess drippings will fall back into the liquid tray whereupon they are re-used to treat further foods contained in the self-leveling food baskets. One of the threaded rods and one of the self-leveling food basket may be located every 60° degrees.

The self-basting rotisserie device may also comprise a heat transfer area which is located below the liquid tray to allow for heating of the food contained within the self-leveling food baskets. The self-basting rotisserie device may be an integral part of a new smoker-style grill or an aftermarket add-on kit for an existing smoker-style grill.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 10 self-basting rotisserie device
- 15 smoker-style grill
- 16 firebox
- 20 smoker enclosure
- 25 access door
- 30 stand
- 35 rotisserie power drive
- 40 AC power cord
- 45 central hexagonal shaft
- 50 smoker enclosure sidewall
- 55 first end plate
- 56 second end plate
- 60 threaded rod
- 65 self-leveling food basket
- 70 liquid tray
- 75 distal end bracket assembly
- 80 single rotating shaft
- 85 wire basket element
- 90 rotational travel path "r"
- 95 basting liquid
- 100 excess drippings
- 105 heat transfer area
- 110 sidewall opening
- 115 bearing
- 120 circular slot
- 125 "U"-shaped support
- 130 offset bracket
- 135 bushing
- 140 set screw
- 145 hexagonal slip coupling
- 150 mounting bracket
- 155 hexagonal opening
- 160 threaded rod opening
- 165 shaft opening
- 170 large vent hole
- 175 small vent hole

DESCRIPTION OF THE PREFERRED EMBODIMENTS

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Figure 1:
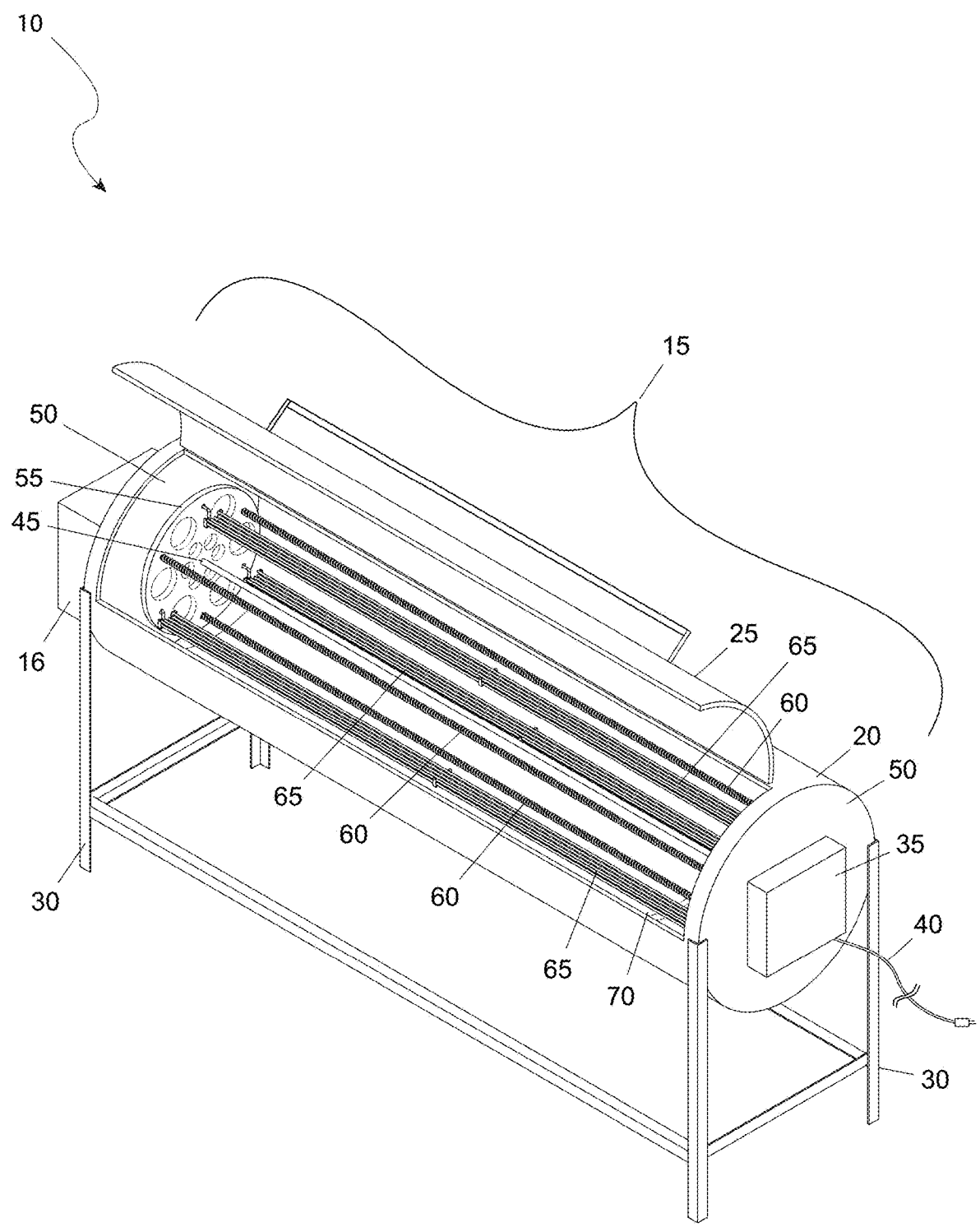
FIG. 1 is a perspective view of a self-basting rotisserie device, shown in a utilized state, according to the preferred embodiment of the present invention.

Referring now to FIG. 1, a perspective view of the self-basting rotisserie device 10, shown in a utilized state, according to the preferred embodiment of the present invention is disclosed. The self-basting rotisserie device (herein also described as the "device") 10, provides for a self-basting rotisserie unit for use on a smoker-style grills 15. The device 10 will be provided as an integral part of a new smoker-style grill 15 or as an aftermarket add-on kit for an existing smoker-style grill 15.

The smoker-style grill 15 is of a customary expected design with a smoker enclosure 20, an access door 25, and a stand 30. The smoker-style grill 15 is provided with a firebox 16, which is capable of containing a fuel source and a smoke source. Such fuel source and smoke source can be charcoal, wood chunks, wood chips, or any other similar fuels. The firebox 16 is located on a first end of the smoker-style grill 15. A rotisserie power drive 35 is located at a second end of the smoker-style grill 15 and is provided with an AC power cord 40 for connection to a suitable power source in a customary manner. The rotisserie power drive 35 rotates a central hexagonal shaft 45 which runs through and penetrates the two (2) smoker enclosure sidewalls 50. A first end plate 55 is located at the first end of the smoker-style grill 15 and in fluid communication with the firebox 16. The first end plate 55 is supported on the central hexagonal shaft 45 and are fixed in position with three (3) threaded rods 60 which work with locking nuts in an expected manner to keep the first end plate 55 in a parallel and aligned position.

Also connected to the first end plate 55 are a set of three (3) self-leveling food baskets 65, which remain in a level position as the central hexagonal shaft 45 turns. Located at the bottom of the smoker enclosure 20 is a liquid tray 70 which contains various basting liquids 95 such as sauces, melted butter, liquid fat, meat drippings, or stock. The location of the firebox 16 in relation to the liquid tray 70 is such that there is no direct transfer of heat from the fuel contents of the firebox 16 to the liquid tray 70 and limited or no boiling away of the basting liquid 95 in the liquid tray 70. Further description of the liquid tray 70 and operation of the device 10 will be provided herein below. It is envisioned that all components of the device 10, with the exception of the rotisserie power drive 35 and the AC power cord 40 would be made of aluminum.

Figure 2:
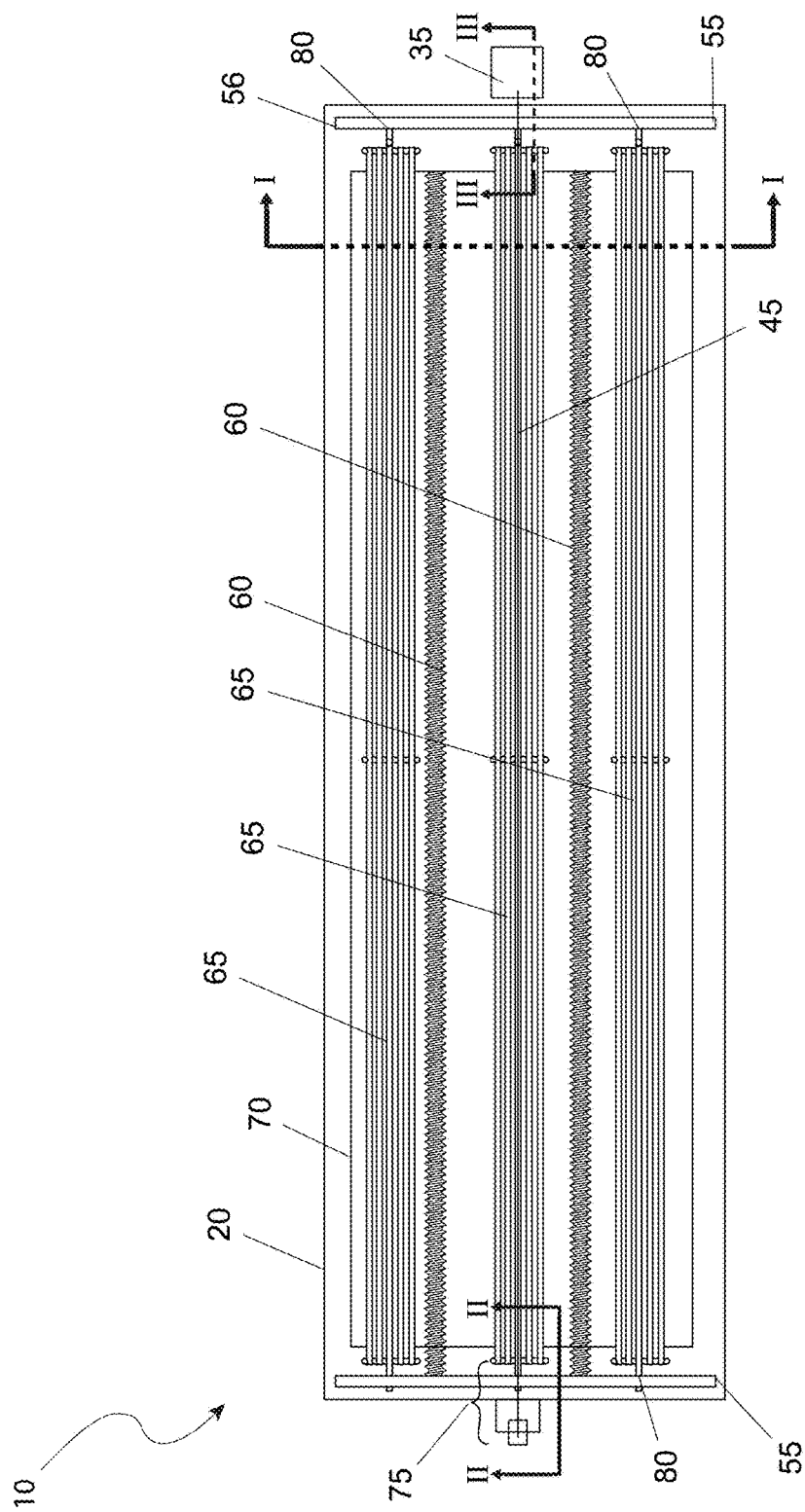
FIG. 2 is a top view of the self-basting rotisserie device, according to the preferred embodiment of the present invention.

Referring next to FIG. 2, a top view of the device 10, according to the preferred embodiment of the present invention is depicted. The rotisserie power drive 35 drives the central hexagonal shaft 45 whereupon it is supported at a distal end bracket assembly 75. The three (3) self-leveling food baskets 65 are attached to the first end plate 55 and the second end plate 56 by a single rotating shaft 80 (for a total quantity of six (6)). The single rotating shaft 80 provides for the self-leveling quality of the self-leveling food baskets 65. Regardless of the position of the self-leveling food baskets 65 within the smoker enclosure 20 they are always over the liquid tray 70 which spans the smoker enclosure 20 from front to back and side to side. The self-leveling food baskets 65 are open in design with wire basket elements 85 running at ninety degrees (90°) to each other similar in design to an open grill surface. The three (3) threaded rods 60 connect to the first end plate 55 and the second end plate 56 as well, in an equally spaced manner to the self-leveling food baskets 65, but in a fixed non-moving manner which holds the first end plate 55 and the second end plate 56 in a parallel manner as they rotate.

Figure 3:
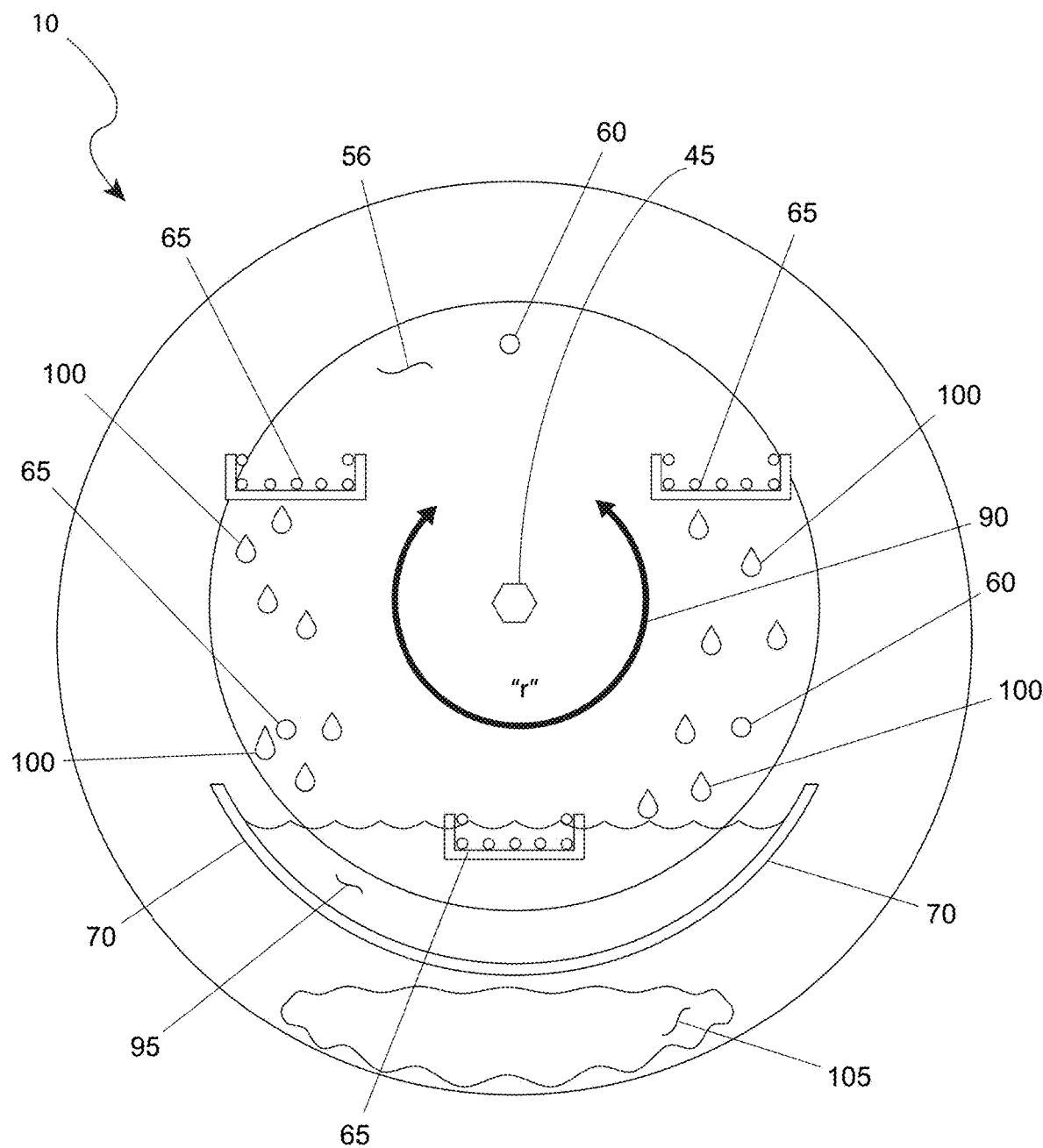
FIG. 3 is a sectional view of the self-basting rotisserie device, as seen along a Line I-I, as shown in FIG. 2, according to the preferred embodiment of the present invention.

Referring now to FIG. 3, a sectional view of the device 10, as seen along a Line I-I, as shown in FIG. 2, according to the preferred embodiment of the present invention is shown. This view exposes the second end plate 56 at the end of the smoker enclosure 20 nearest the rotisserie power drive 35 (both of which are shown in FIG. 2). The central hexagonal shaft 45 is routed through the center of the second end plate 56. The three (3) threaded rods 60 are located at one-hundred-twenty degrees (120°) to each other. The three (3) self-leveling food baskets 65 are equally dispersed between the threaded rods 60 also at one-hundred-twenty degrees (120°) to each other. Thus, a threaded rod 60 and a self-leveling food basket 65 are located every sixty degrees (60°). As aforementioned described, the second end plate 56 as well as the first end plate 55 (as shown in FIG. 2) rotates either clockwise or counter-clockwise along a rotational travel path "r" 90. As such rotation happens, each of the self-leveling food baskets 65 will pass through a basting liquid 95 confined within the liquid tray 70. Such submersion will ensure that all surfaces of the contained food in the self-leveling food baskets 65 will be coated. As the lower-most self-leveling food basket 65 exits the basting liquid 95, excess drippings 100 will fall back into the liquid tray 70 whereupon they can be re-used to treat further foods contained in the self-leveling food baskets 65. A heat transfer area 105 is located below the liquid tray 70 to allow for heating of the food contained within the self-leveling food baskets 65 as well. It is noted that other heat transfer areas, such as in the space between the first end plate 55 and the second end plate 56 may also be utilized.

Figure 4:
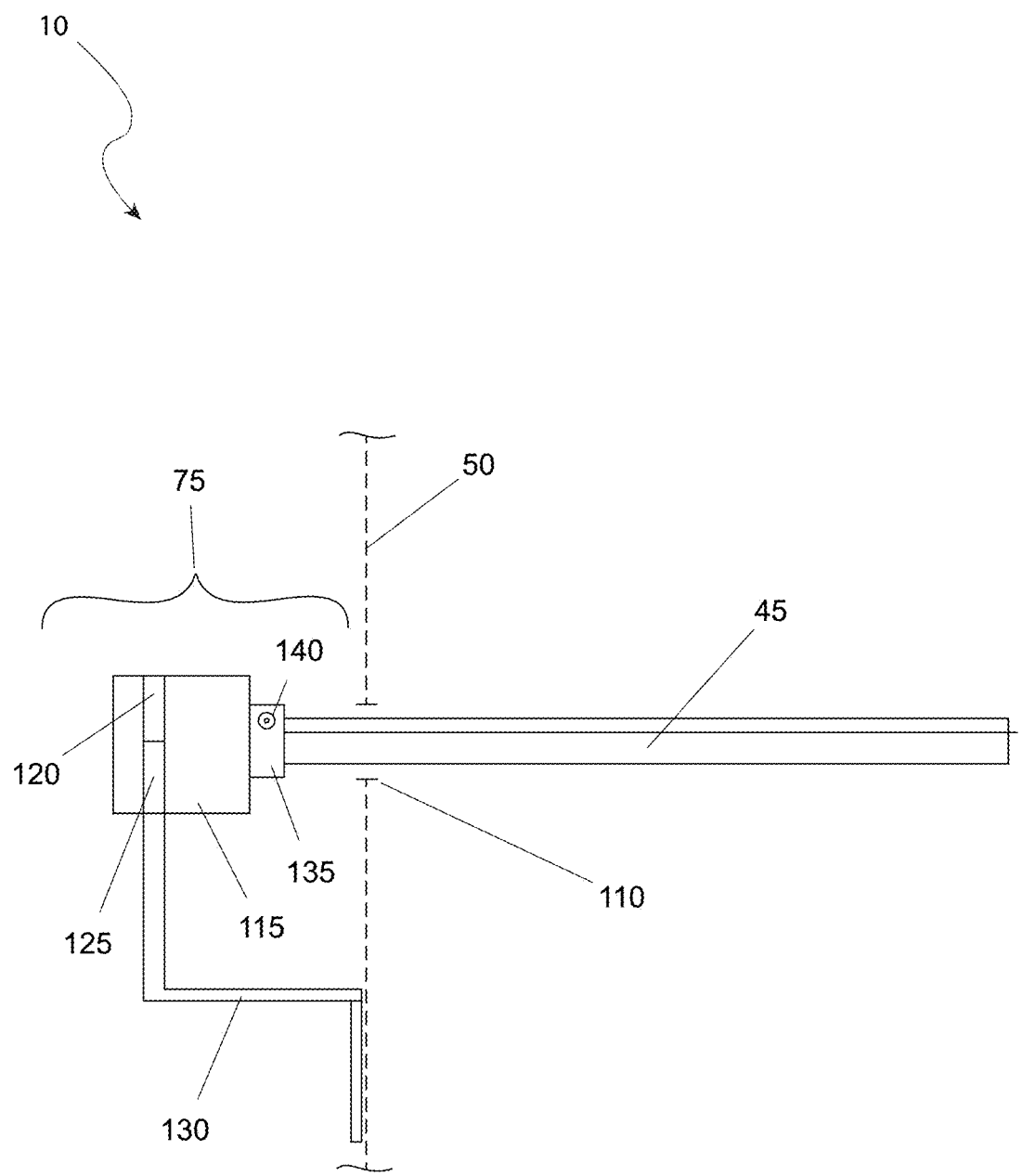
FIG. 4 is a sectional view of the self-basting rotisserie device, as seen along a Line II-II, as shown in FIG. 2, according to the preferred embodiment of the present invention.

Referring next to FIG. 4, a sectional view of the device 10, as seen along a Line II-II, as shown in FIG. 2, according to the preferred embodiment of the present invention is disclosed. This figure provides additional information pertaining to the distal end bracket assembly 75. The central hexagonal shaft 45 penetrates the smoker enclosure sidewalls 50 through a sidewall opening 110. The central hexagonal shaft 45 then terminates in a bearing 115. The bearing 115 is provided with a circular slot 120 that rides in a "U"-shaped support 125 of an offset bracket 130. The offset bracket 130 is then supported by attachment to the smoker enclosure sidewalls 50. The central hexagonal shaft 45 is attached to the bearing 115 by use of a bushing 135 attached by a set screw 140.

Figure 5:
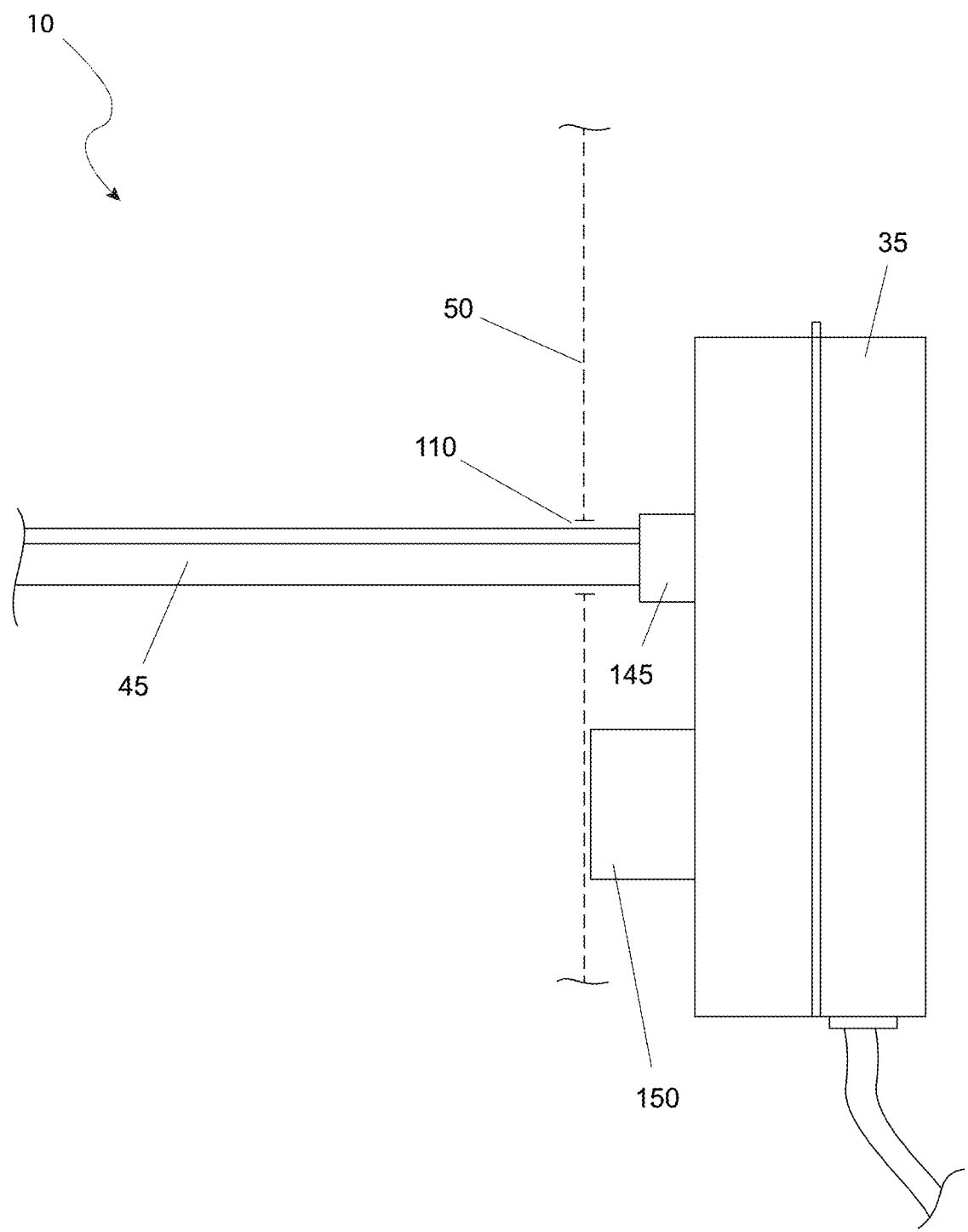
FIG. 5 is a sectional view of the self-basting rotisserie device, as seen along a Line III-III, as shown in FIG. 2, according to the preferred embodiment of the present invention.

Referring now to FIG. 5, a sectional view of the device 10, as seen along a Line III-III, as shown in FIG. 2, according to the preferred embodiment of the present invention is depicted. The end of the central hexagonal shaft 45 (opposite that shown in FIG. 4) is connected to the rotisserie power drive 35 via a hexagonal slip coupling 145. The configuration of the hexagonal slip coupling 145 allows for easy disconnection of the rotisserie power drive 35 while still providing the means to drive the device 10 in the rotational travel path "r" 90 (as shown in FIG. 3). The central hexagonal shaft 45 passes through a sidewall opening 110 in the smoker enclosure sidewalls 50, while the rotisserie power drive 35 is supported on the smoker enclosure sidewalls 50 by use of a mounting bracket 150.

Figure 6:
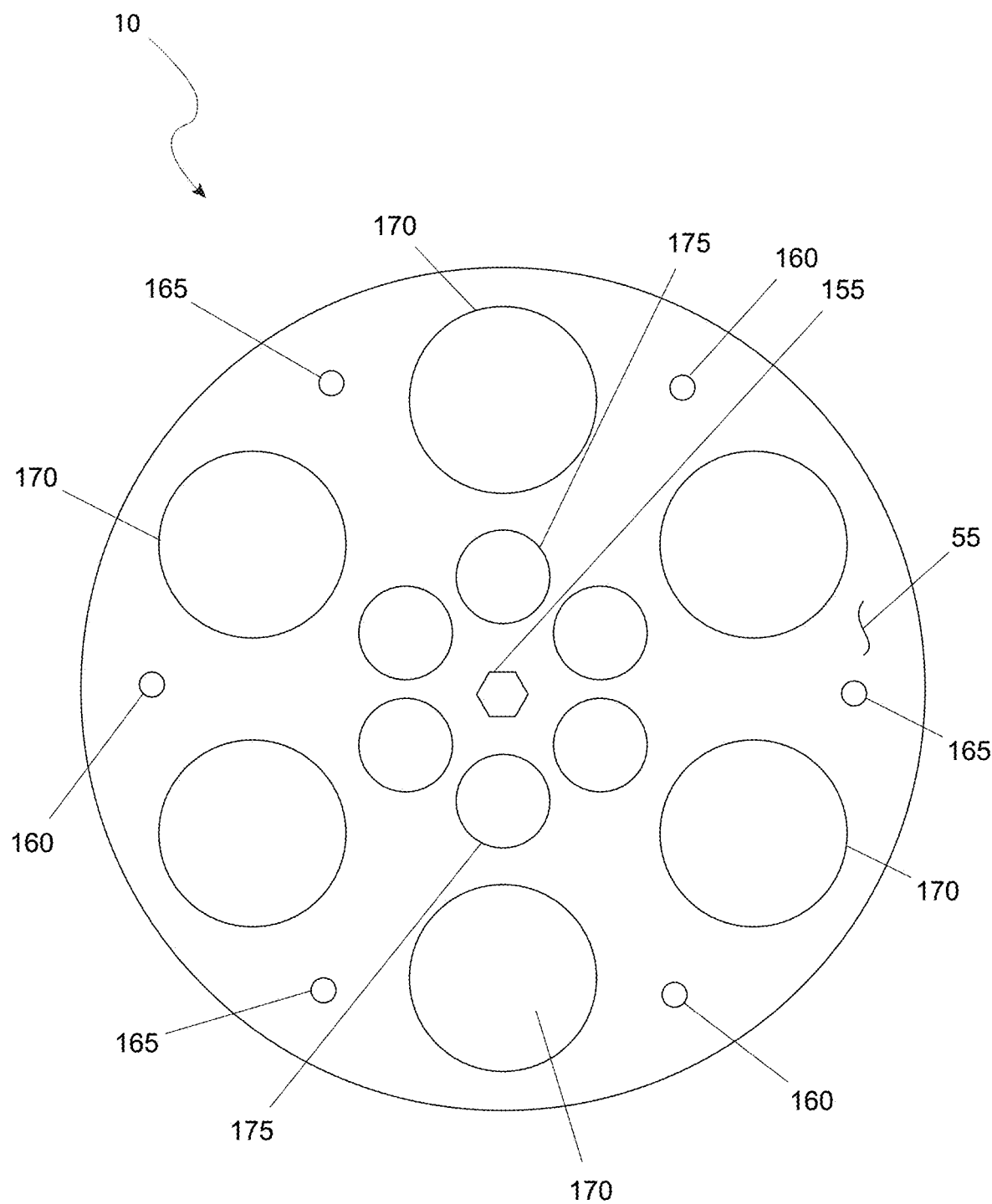
FIG. 6 is a side view of a first end plate, as used with the self-basting rotisserie device, according to the preferred embodiment of the present invention.

Referring to FIG. 6, a side view of the first end plate 55, as used with the device 10, according to the preferred embodiment of the present invention is shown. The center of the first end plate 55 is provided with a hexagonal opening 155. Three (3) threaded rod openings 160 are provided for the threaded rods 60 as shown in FIG. 1) located at one-hundred-twenty degrees (120°) while three (3) shaft openings 165 are provided for the single rotating shaft 80 (as shown in FIG. 2) also at one-hundred-twenty degrees (120°).

Six (6) large vent holes 170 are provided on the outer perimeter of the first end plate 55 while six (6) small vent holes 175 are provided on the inner perimeter. The large vent holes 170 and the small vent holes 175 are provided to allow smoke and heat produced from the fuel within the firebox 16 to pass through the first end plate 55 to ensure even food cooking and smoke flavoring.

Figure 7:
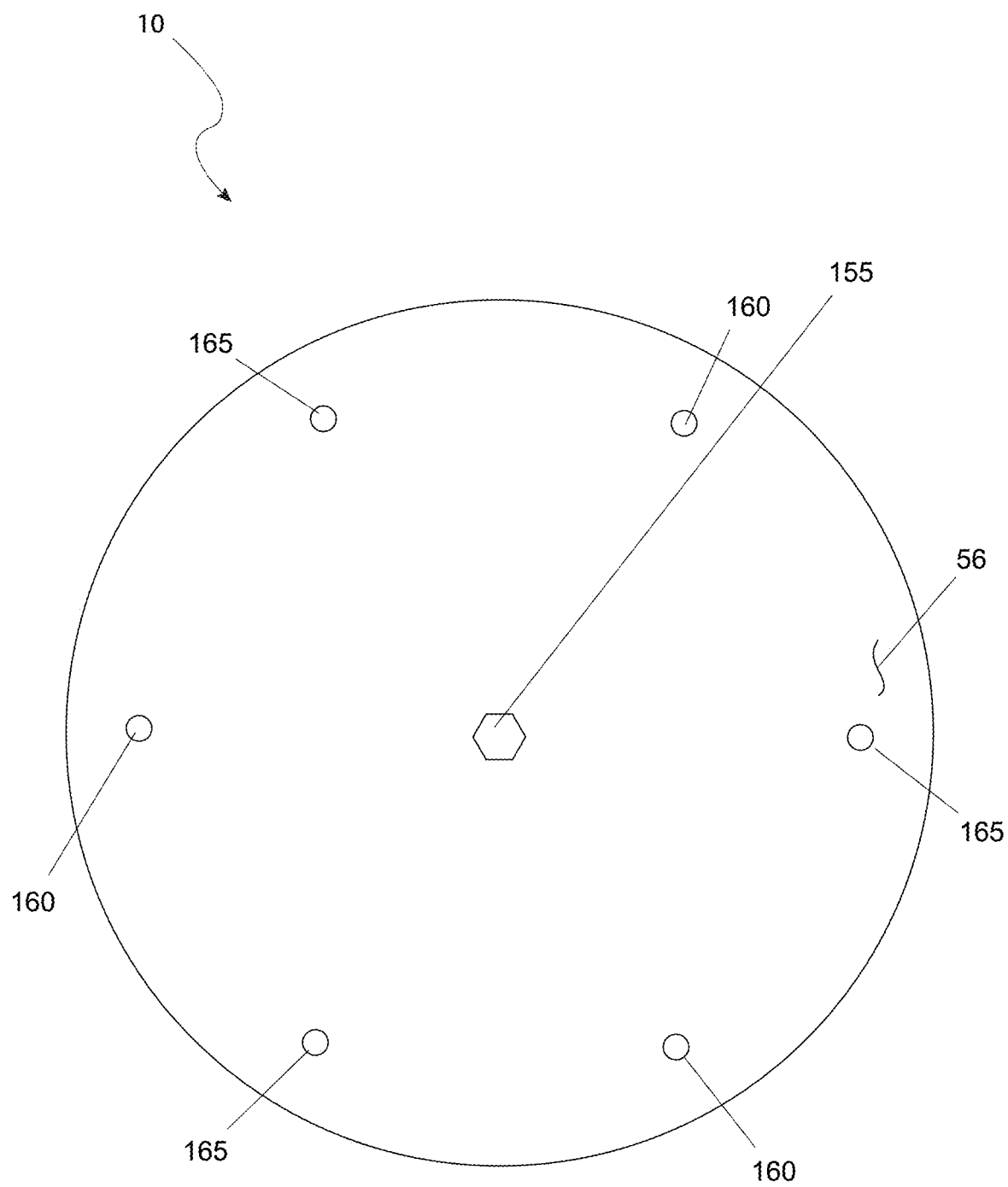
FIG. 7 is a side view of a second end plate, as used with the device, according to the preferred embodiment of the present invention.

Referring now to FIG. 7, a side view of the second end plate 56, as used with the device 10, according to the preferred embodiment of the present invention is shown. The center of the second end plate 56 is provided with a hexagonal opening 155. Three (3) threaded rod openings 160 are provided for the threaded rods 60 as shown in FIG. 1) located at one-hundred-twenty degrees (120°) while three (3) shaft openings 165 are provided for the single rotating shaft 80 (as shown in FIG. 2) also at one-hundred-twenty degrees (120°).

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 6. The user would procure the device 10 from conventional procurement channels such as discount stores, department stores, home improvement stores, appliance retailers, mail order and internet supply houses and the like. Special attention would be paid to the overall size of the device 10, whether it is included as part of a new smoker-style grill 15 or sold as an add-on kit for use with a specific make and model of smoker-style grill 15.

After procurement and prior to utilization, the device 10 would be prepared in the following manner: various foodstuffs would be placed on the self-leveling food baskets 65, most commonly ribs and other barbequed foods, but any type of food may be utilized; the smoker-style grill 15 is activated with an acceptable heating/smoking source placed within the firebox 16; the liquid tray 70 is filled with the desired basting liquid 95; and the rotisserie power drive 35 connected to a suitable power source by the AC power cord 40. At this point in time, the device 10 is ready for use.

During utilization of the device 10, the following procedure would be initiated: the foodstuffs in the self-leveling food baskets 65 would travel along the rotational travel path "r" 90 whereupon the lowest self-leveling food baskets 65, during each revolution, would not only travel through the hottest part of the smoker-style grill 15, but also become submerged in the basting liquid 95 contained within the liquid tray 70; as the self-leveling food baskets 65 continues along its rotational travel path "r" 90, excess drippings 100 drips off of the respective self-leveling food baskets 65 and onto the other two (2) self-leveling food baskets 65 or back into the liquid tray 70. Concurrently, the heat and smoke produced from the fuel in the firebox 16 would travel through the large vent holes 170 and small vent holes 175 of the first end plate 55 to flavor and heat the foodstuffs; This operation then continues until the foodstuffs are appropriately cooked.

After use of the device 10, the foodstuffs are removed for consumption, the liquid tray 70 is emptied of any remaining basting liquid 95; and the components of the device 10 are cleaned, thus readying it for future use in a repeating and cyclical process.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A self-basting rotisserie device, comprising:
   a smoker-style grill having a smoker enclosure, an access door, and a stand, the smoker-style grill includes a liquid tray containing a plurality of basting liquids located at a bottom of the smoker enclosure;
   a firebox disposed on a first end of the smoker-style grill, the firebox containing a fuel source and a smoke source;
   a rotisserie power drive disposed on a second end of the smoker-style grill and an AC power cord for connection to a power source;
   a first end plate disposed on the first end of the smoker-style grill, the first end plate is in fluid communication with the firebox and,
   wherein the rotisserie power drive rotates a central hexagonal shaft which runs through and penetrates a pair of smoker enclosure sidewalls;
   wherein the rotisserie power drive drives the central hexagonal shaft whereupon it is supported at a distal end bracket assembly;
   wherein the first end plate is supported on the central hexagonal shaft and is fixed in position with three threaded rods which work with a plurality of locking nuts in an expected manner to keep the first end plate in a parallel and aligned position;
   wherein the first end plate includes three self-leveling food baskets, which remain in a level position as the central hexagonal shaft rotates;
   wherein the three self-leveling food baskets are attached to the first end plate and a second end plate by a single rotating shaft;
   wherein the self-leveling food baskets within the smoker enclosure are always over the liquid tray which spans the smoker enclosure;
   wherein the self-leveling food baskets are open in design with a plurality of wire basket elements running at 90 degrees to each other; and,
   wherein the three threaded rods connect to the first end plate and the second end plate in an equally spaced manner to the self-leveling food baskets.

2. The self-basting rotisserie device, according to claim 1, wherein the basting liquids are selected from the group consisting of one or more sauces, a plurality of melted butter, a plurality of liquid fat, one or more meat drippings, or a stock.

3. The self-basting rotisserie device, according to claim 1, wherein the firebox located in relation to the liquid tray is such that there is no direct transfer of heat from the fuel contents of the firebox to the liquid tray and there is limited or no boiling away of the basting liquid in the liquid tray.

4. The self-basting rotisserie device, according to claim 1, wherein the fuel source is selected from the group consisting of a plurality of charcoal, a plurality of wood chunks, or a plurality of wood chips.

5. The self-basting rotisserie device, according to claim 1, wherein the smoke source is selected from the group consisting of a plurality of charcoal, a plurality of wood chunks, or a plurality of wood chips.

6. The self-basting rotisserie device, according to claim 1, wherein the second end plate and the first end plate rotates either clockwise or counter-clockwise along a rotational travel path.

7. The self-basting rotisserie device, according to claim 1, wherein each of a rotating self-leveling food baskets will pass through a basting liquid confined within the liquid tray to ensure that all surfaces of a contained food in the self-leveling food baskets will be coated.

8. The self-basting rotisserie device, according to claim 1, wherein a lowermost self-leveling food basket exits the basting liquid and a plurality of excess drippings will fall back into the liquid tray whereupon they are re-used to treat further foods contained in the self-leveling food baskets.

9. The self-basting rotisserie device, according to claim 1, wherein one of a threaded rods and one of a self-leveling food basket are located every 60 degrees.

10. The self-basting rotisserie device, according to claim 1, further comprising a heat transfer area is located below the liquid tray to allow for heating of the food contained within the self-leveling food baskets.

11. The self-basting rotisserie device, according to claim 1, wherein the self-basting rotisserie device is an integral part of a new smoker-style grill.

12. The self-basting rotisserie device, according to claim 1, wherein the self-basting rotisserie device is an aftermarket add-on kit for an existing smoker-style grill.

* * * * *